United States Patent [19]
Saito

[11] Patent Number: 5,813,024
[45] Date of Patent: Sep. 22, 1998

[54] DISK CONTROL METHOD FOR USE WITH A DATA STORAGE APPARATUS HAVING MULTIPLE DISKS

[75] Inventor: Hiroyuki Saito, Kanagawa, Japan

[73] Assignee: Fuji Xerox Co., Ltd., Tokyo, Japan

[21] Appl. No.: 745,854

[22] Filed: Nov. 8, 1996

Related U.S. Application Data

[62] Division of Ser. No. 677,623, Jul. 8, 1996, which is a continuation of Ser. No. 127,355, Sep. 28, 1993.

[30] Foreign Application Priority Data

Sep. 29, 1992 [JP] Japan .................................. 4-260008

[51] Int. Cl.⁶ ........................................................ G06F 12/00
[52] U.S. Cl. .............................................................. 711/113
[58] Field of Search .................................. 395/440, 439; 711/112, 113

[56] References Cited

U.S. PATENT DOCUMENTS

| | | | |
|---|---|---|---|
| Re. 34,025 | 8/1992 | Hester et al. ............................ | 395/375 |
| 4,949,245 | 8/1990 | Martin et al. ........................... | 395/850 |
| 5,008,819 | 4/1991 | Gorbatenko ............................ | 395/443 |
| 5,218,695 | 6/1993 | Noveck et al. ......................... | 395/600 |
| 5,392,445 | 2/1995 | Takamoto et al. ..................... | 395/800 |

FOREIGN PATENT DOCUMENTS

| | | |
|---|---|---|
| 3-103918 | 4/1991 | Japan . |
| 4-7730 | 1/1992 | Japan . |

*Primary Examiner*—David L. Robertson
*Assistant Examiner*—Denise Tran
*Attorney, Agent, or Firm*—Finnegan, Henderson, Farabow, Garrett & Dunner, L.L.P.

[57] ABSTRACT

A disk control method for transferring large quantities of data to a data storage apparatus comprising a plurality of disk units without the use of a large buffer memory. Each of the disk units has at least one of a read cache and a write cache function. The data storage apparatus also includes an interface which, connected independently to each of the disk units, executes a protocol ranging from the issuance of a command to any one of the disk units up to the reception of status resulting from execution of the command as well as the reception of a message indicating the end of the command execution. In operation, the protocol of one disk unit is completed first, followed by issuance of a command for the next protocol. Thereafter, the protocol of another disk unit is completed, followed by issuance of a Transfer command. The method allows data transfer to be started immediately between the cache memory and the disk units with no rotational delays involved.

6 Claims, 6 Drawing Sheets

DISK CONTROL METHOD FOR USE WITH A DATA STORAGE APPARATUS HAVING MULTIPLE DISKS

This is a division of application Ser. No. 08/677,623, filed Jul. 8, 1996, which application is a continuation of Ser. No. 08/127,355, filed Sep. 28, 1993, now abandoned.

BACKGROUND OF THE INVENTION

1. Field of the Invention

The present invention relates to a disk control method for controlling a data storage apparatus using a plurality of disk units for high-speed data transmission. More particularly, the invention relates to a disk control method for controlling a data storage apparatus for use with image processing devices such as copiers and facsimile machines, the data storage apparatus utilizing a plurality of disk units to handle image data in a way that permits high-speed data transmission.

2. Description of the Prior Art

Magnetic and optical disk units are used extensively as data storage apparatuses for storing large quantities of data such as image data. Magnetic and optical disk units are much less expensive than semiconductor memories in terms of unit capacity, but the former are much slower than the latter when it comes to access speed. To enhance their access speed, disk units have incorporated various improvements. Such improvement measures illustratively include synchronous data transmission, read cache and write cache functions.

Synchronous data transmission involves offsetting the timings of a transmission request signal (REQ) and a transmission acknowledge signal (ACK) so as to speed up data transmission to and from a buffer memory of the disk units.

The disk unit having the read cache function allows a cache memory inside to receive data from the contiguous address following the disk address designated by a read command. When another read command is issued to read the data from the contiguous address, the data are read not from the disk but from the cache memory for transfer to an interface. Because it is not necessary to wait for the disk to rotate every time to reach appropriate positions, high-speed data transmission is effected.

The disk unit having the write cache function writes transferred data not immediately to the disk but to a cache memory, so that a write protocol for the unit is completed. Thus another write command may be issued immediately. Where a write command requires writing data to continuous addresses, the data are accumulated and written to the disk on a batch basis. In this case, too, little rotational delay occurs so that the speed of data transmission is enhanced.

The above measures have their share of disadvantages. Synchronous data transmission improves the speed of data transmission over buses but does little to shorten the time of access to the disk. If the size of data is large enough to require a number of access operations on the disk, the total processing time remains almost unchanged. The read and write cache functions reduce rotational delay time, but the resulting access speed is still much slower than that of semiconductor memories. One prior art solution to this problem, as disclosed in Japanese Patent Laid-Open No. HEI/4-7730, is a disk control method for running a plurality of disk units in parallel for speedier data transmission. The disclosed method involves dividing the bus width into units and furnishing a buffer memory arrangement so as to reduce data transfer time through parallel operation of the multiple disk units. Meanwhile, Japanese Patent Laid-Open No. HEI/3-103918 discloses a method for dividing data into portions of a predetermined length for parallel read and write operations. The apparatus for use with the latter prior art method also incorporates a local memory arrangement.

Where the size of data is large enough to require sequential access, as in the case of image data, the above-mentioned prior art methods have the following disadvantages: For a write operation to the disk, the method of Japanese Patent Laid-Open No. HEI/4-7730 causes data to be transferred to the disk after latency time upon completion of data transfer to the buffer memory. For a read operation from the disk, the method reads data from the buffer memory upon completion of data transfer from the disk to the buffer memory. This means that where the data size is sufficiently large, one of two things is required: either to enlarge the buffer memory capacity, or to repeat data transfers between buffer memory and disk. On the one hand, enlarging the buffer memory capacity leads to higher costs. On the other hand, rotational delay occurs every time data transfer is carried out between buffer memory and disk, thus preventing the overall processing speed from improving significantly.

According to the method of data division of Japanese Patent Laid-Open No. HEI/3-103918, it is necessary to furnish as many one-track local memories as the number of disks involved so as to implement data transfer to the target disk. For a write operation to the disk, the data division method accumulates target data in a one-track local memory before writing the data to the disk. For a read operation from the disk, the method accumulates data read from the disk in a local memory before reading the data from the local memory. These aspects are also shared by the method of Japanese Patent Laid-Open No. HEI/4-7730. It follows that where there are large quantities of data, data transfer takes appreciably long.

SUMMARY OF THE INVENTION

It is therefore an object of the present invention to provide a disk control method for controlling a data storage apparatus comprising a plurality of disk units, whereby large quantities of data are transferred to and from the data storage apparatus at high speed without the use of large buffer memory capacities.

In carrying out the invention and according to one aspect thereof, there is provided a disk control method for use with a data storage apparatus having n disk units and an interface, n being a positive integer of at least 2. Each of the disk units incorporates at least one of a read cache and a write cache function. The interface, connected independently to each of the disk units, executes a protocol ranging from the issuance of a command to any one of the disk units up to the reception of status resulting from execution of the command as well as the reception of a message indicating the end of the command execution. The disk control method comprises the following steps: dividing into predetermined units the data to be handled for any one of a write and a read operation; issuing a first command to a first disk unit for data transfer so as to complete the protocol up to the status and message reception for the first disk unit; issuing a second command to a second disk unit between the time the first command is issued to the first disk unit and the time the protocol for the first disk unit is completed, so that data transfer is effected to the second disk unit and the protocol up to the status and message reception is completed for the second disk unit after completion of the protocol for the first disk unit; repeating the above steps up to the n-th disk unit; issuing another command to the first disk unit between the time the protocol for the first disk unit is completed and the time the protocol for the n-th disk unit is completed, so that data transfer is effected to the first disk unit and the protocol up to the status and message reception is completed for the first disk unit after completion of the protocol for the n-th disk unit; issuing another command to the second disk unit between the time the protocol for the second disk unit is completed and the time the protocol for the first disk unit is completed, so that data transfer is effected to the second disk unit and the protocol up to the status and message reception is completed for the second disk unit after completion of the protocol for the first disk unit; and repeating the above steps until a predetermined number of data units have been transferred.

When a plurality of disk units having a cache memory function each are accessed sequentially, rotational delay time does not occur between repeatedly issued commands for reading or writing divided data. This means that the access time involved is approximately the same as that when the whole data are transferred using a single command. Because data transfers over the interface bus are effected to and from the cache memory alone, the duration of time in which the interface bus is actually occupied for data transfers is not appreciably long. The bus occupying time may be shortened further if a synchronous data transmission scheme is implemented.

According to the invention, a given set of data is divided into predetermined units. A first command is then issued to a first disk unit for data transfer so as to complete the protocol up to the status and message reception for the first disk unit. Next, a second command is issued to a second disk unit between the time the first command is issued to the first disk unit and the time the protocol for the first disk unit is completed, so that data transfer is effected to the second disk unit and the protocol up to the status and message reception is completed for the second disk unit after completion of the protocol for the first disk unit. These steps are repeated up to the n-th disk unit. Then another command is issued to the first disk unit between the time the protocol for the first disk unit is completed and the time the protocol for the n-th disk unit is completed, so that data transfer is effected to the first disk unit and the protocol up to the status and message reception is completed for the first disk unit after completion of the protocol for the n-th disk unit. Yet another command is issued to the second disk unit between the time the protocol for the second disk unit is completed and the time the protocol for the first disk unit is completed, so that data transfer is effected to the second disk unit and the protocol up to the status and message reception is completed for the second disk unit after completion of the protocol for the first disk unit. These steps are repeated until a predetermined number of data units have been transferred. In this manner, it is possible to transfer data to and from the data storage apparatus comprising a plurality of disk units without the use of large buffer memory capacities.

These and other objects, features and advantages of the invention will become more apparent upon a reading of the following description and appended drawings.

DESCRIPTION OF THE PREFERRED EMBODIMENT

Figure 1:
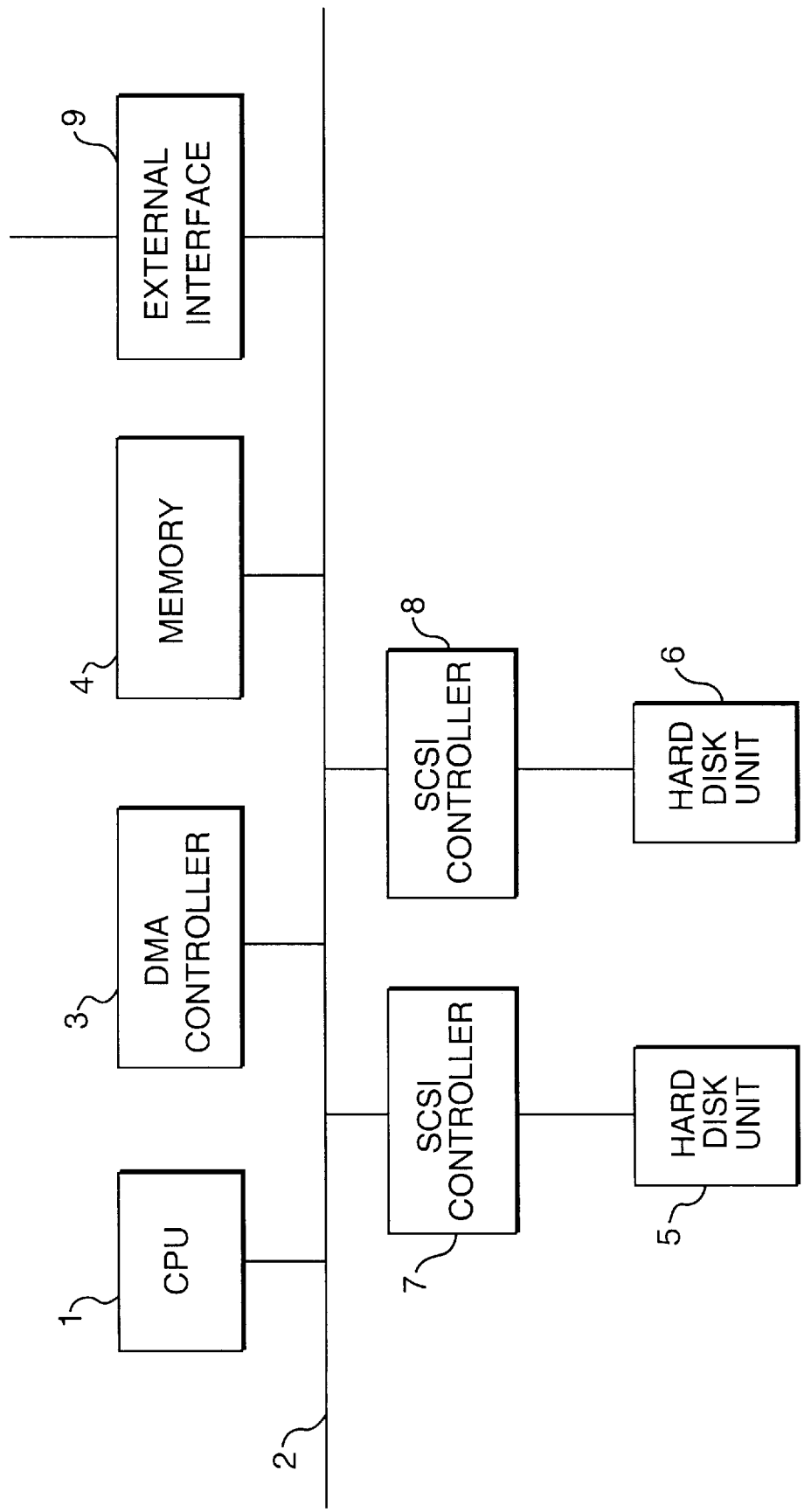
FIG. 1 is a block diagram of a data storage apparatus embodying the disk control method according to the invention.

A preferred embodiment of the invention will now be described with reference to the accompanying drawings. Shown in FIG. 1 is a block diagram of a data storage apparatus embodying the disk control method according to the invention. In FIG. 1, a CPU (central processing unit) 1 is connected to a DMA (direct memory access) controller 3 and a memory 4 via a bus 2. The bus 2 is connected to a plurality of hard disk units 2 (2 units 5 and 6 in this setup) via SCSI (small computer system interface) controllers 7 and 8, respectively. Furthermore, the bus 2 is connected to an image input/output device, not shown, such as an image scanner or laser printer via an external interface 9. The SCSI is an interface standard that covers computer peripherals, defined in ANSI X3. 131-1986 as part of the American National Standards. Under the SCSI standard, an initiator that issues commands is connected through an SCSI bus to a target that executes the commands. In the example of FIG. 1, the initiator is the CPU 1; the target is any one of the SCSI controllers 7 and 8 and the hard disks 5 and 6.

Figure 2:
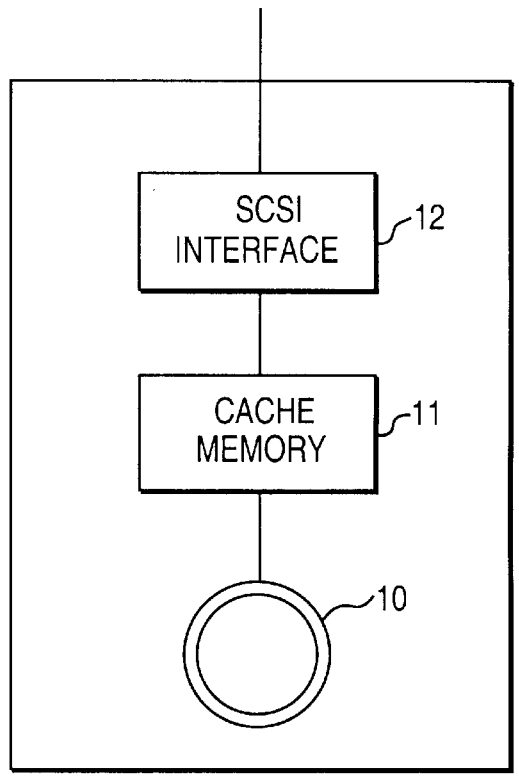
FIG. 2 is a schematic view showing a typical constitution of a hard disk unit for use with the embodiment of FIG. 1.

The hard disk units 5 and 6 have the same constitution. As shown schematically in FIG. 2, the two units each comprise a recording medium 10 (i.e., hard disk), a cache memory 11 and an SCSI interface 12 and are designed to accumulate data.

The SCSI controllers 7 and 8 each execute such phases as "Bus Free," "Selection," "Command Out," "Data Out," "Data In," "Status" and "Message In" constituting the protocol of the SCSI standard. In executing these phases, the SCSI controllers 7 and 8 write and read data to and from the hard disk units 5 and 6, respective.

The "Bus Free" phase is a phase in which none of the devices configured drives the bus. In the "Selection" phase, the initiator selects the target. In the "Command Out" phase, the initiator sends a command to the target. The commands under the SCSI standard comprise command descriptor blocks (CDB) made of a plurality of bytes each. A command descriptor block includes various commands such as a Read and a Write command. In the "Data Out" phase, the initiator transfers data to the target; in the "Data In" phase, the target transfers data to the initiator; in the "Status" phase, the target supplies the initiator with a status byte indicating the result of command execution; and in the "Message In" phase, the target supplies the initiator with a message byte denoting the completion of a command.

Figure 3:
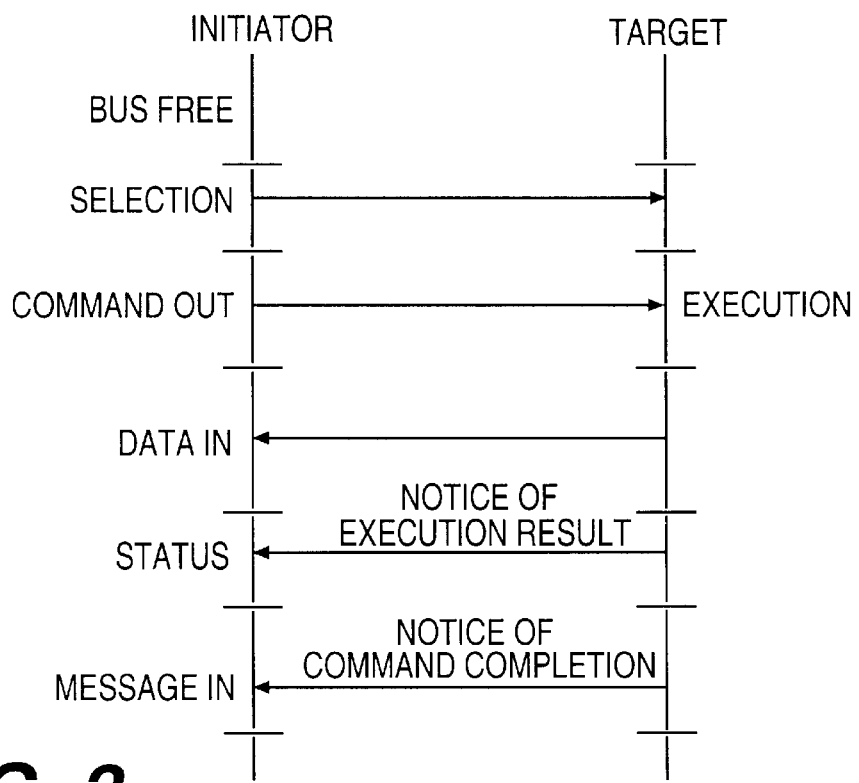
FIG. 3 is a view depicting one of the simplest sequences pursuant to the SCSI standard.

FIG. 3 depicts one of the simplest sequences pursuant to the SCSI standard. As shown in FIG. 3, the initiator enters the "Selection" phase after verifying the "Bus Free" phase. On selecting the target in the "Selection" phase, the initiator goes to the "Command Out" phase in which the target executes a command received from the initiator. In the "Data In" phase, the target sends data to the initiator upon execution of the command. After entering the "Status" phase, the target notifies the initiator of the result of command execution. Finally, the target enters the "Message In" phase to notify the initiator of the completion of the current command. The "Message In" phase is followed by the "Bus Free" phase.

According to the SCSI standard, the initiator that issues commands is connected via the SCSI bus to the target that executes these commands. There many be a plurality of initiators connected to the SCSI bus via an arbiter. In the embodiment of FIG. 1, the SCSI bus connects one initiator with one target, so that there is no need for arbitration. The DMA controller 3 permits alternately DMA transfer between the memory 4 and the SCSI controller 7 on the one hand, and DMA transfer between the memory 4 and the SCSI controller 8 on the other. The memory 4 is used as a buffer that accommodates temporarily the data written to or read from the hard disk units 5 and 6 through the external interface 9 connected to the bus 2. The memory 4 is also used for other aspects of image processing.

It is assumed that the data transfer rate between the memory 4 and the external interface 9 is at least twice that of any one of the hard disk units configured. The CPU 1 controls the. SCSI controllers 7 and 8 as well as the DMA controller 3. In operation, the CPU 1 issues commands for executing SCSI bus phases to the SCSI controllers 7 and 8 and is notified therefrom of the end of command execution by interruption. Listed in Table 1 below are the specifications (per unit) of the hard disk units 5 and 6.

TABLE 1

| Interface | SCSI |
| --- | --- |
| Synchronous transfer rate | 5.0 megabytes/sec. |
| Asynchronous transfer rate | 2.0 megabytes/sec. |
| Storage capacity | 120 megabytes |
| Cache memory | 64 kilobytes |
| No. of bytes per sector | 512 |
| No. of sectors per track | 50 |
| No. of tracks per cylinder | 4 |
| Revolutions | 3,600 rpm |
| Rotational delay | 16.7 ms |
| Sector skew | 12 sectors |
| Cylinder skew | 25 sectors |

The capacity per track is 512 bytes times 50 sectors amounting to 25 kilobytes. The cache memory 11 has a capacity equivalent to at least 2 tracks. Where data are serially written to or read from contiguous addresses on the recording medium 10, the data transfer rate per track is given as $$25 \times 2^{10} \text{ (bytes)} \times 3,600 \text{ (rpm)} \div 60 \text{ (sec.)} = 1.536 \times 106 \text{ (bytes/sec.)}$$

Thus 25 kilobytes of data are transferred at a rate of 1.536 megabytes per second between the recording medium 10 and the cache memory 11. Furthermore, synchronous data transmission is carried out over the SCSI bus.

Synchronous data transmission is a scheme for controlling the transmission of data while verifying transmission request signals (REQ) and transmission acknowledge signals (ACK) by their counts. With the SCSI interface, the initial value is transmitted (after power-up or reset) in asynchronous mode. After the "Selection" phase, the settings of synchronous data transmission are defined through a single message exchange. The parameters to be defined are a REQ/ACK offset and a minimum transmission time. The REQ/ACK offset denotes the maximum number of REQ signals that the target is allowed to transmit before receiving an ACK signal. The minimum transmission time is a minimum repeat period for REQ and ACK signals (i.e., the period from one trailing edge to the next).

Before receiving an ACK signal, the target may send a number of REQ signals not in excess of the REQ/ACK offset. When the difference between the REQ and the ACK count has reached the offset, the target is prevented from sending any more REQ signal until the next ACK signal becomes active. For the "Data In" phase to end normally, it is necessary that the REQ count be equal to the ACK count. Unlike asynchronous data transmission schemes that require checking each and every REQ and ACK signal for its status change, synchronous data transmission involves simply verifying the REQ and ACK counts against their offset. This permits data transmission at high speeds.

The REQ/ACK offset and the minimum transmission time are not uniquely defined; they vary from machine to machine. The constraint on these parameters is this: that their active and inactive periods are to be a minimum of 90 nanoseconds each. From this, the minimum transmission time is up to $$1/180 \text{ ns} - 5.5 \times 10^6 = 5.5 \text{ megabytes/sec.}$$

In practice, SCSI-compatible hard disk units in the high-speed class for supporting synchronous data transmission generally have a minimum transmission time of 5 megabytes per second. Given the synchronous transmission rate of 5 megabytes/sec., the time required to transfer one track of data between the cache memory 11 and the SCSI bus is at most a third of the time required to transfer the same amount of data between the recording medium 10 and the cache memory 11.

Data are divided in units of the capacity of one track, i.e., 25 kilobytes. The first 25 kilobytes of data are written to the hard disk unit 5, and the subsequently divided units of data are written alternately to the hard disk units 6 and 5. In a read operation, likewise, the first 25 kilobytes of data are read from the hard disk unit 5; the subsequent units of data are read alternately from the hard disk units 6 and 5. If the divided data units each 25 kilobytes long are numbered 0, 1, 2, 3, etc., the address to which data units No. 0 and No. 1 are written in the hard disk unit 5 is the same as the address to which data units No. 2 and No. 3 are written in the hard disk unit 6.

Figure 4:
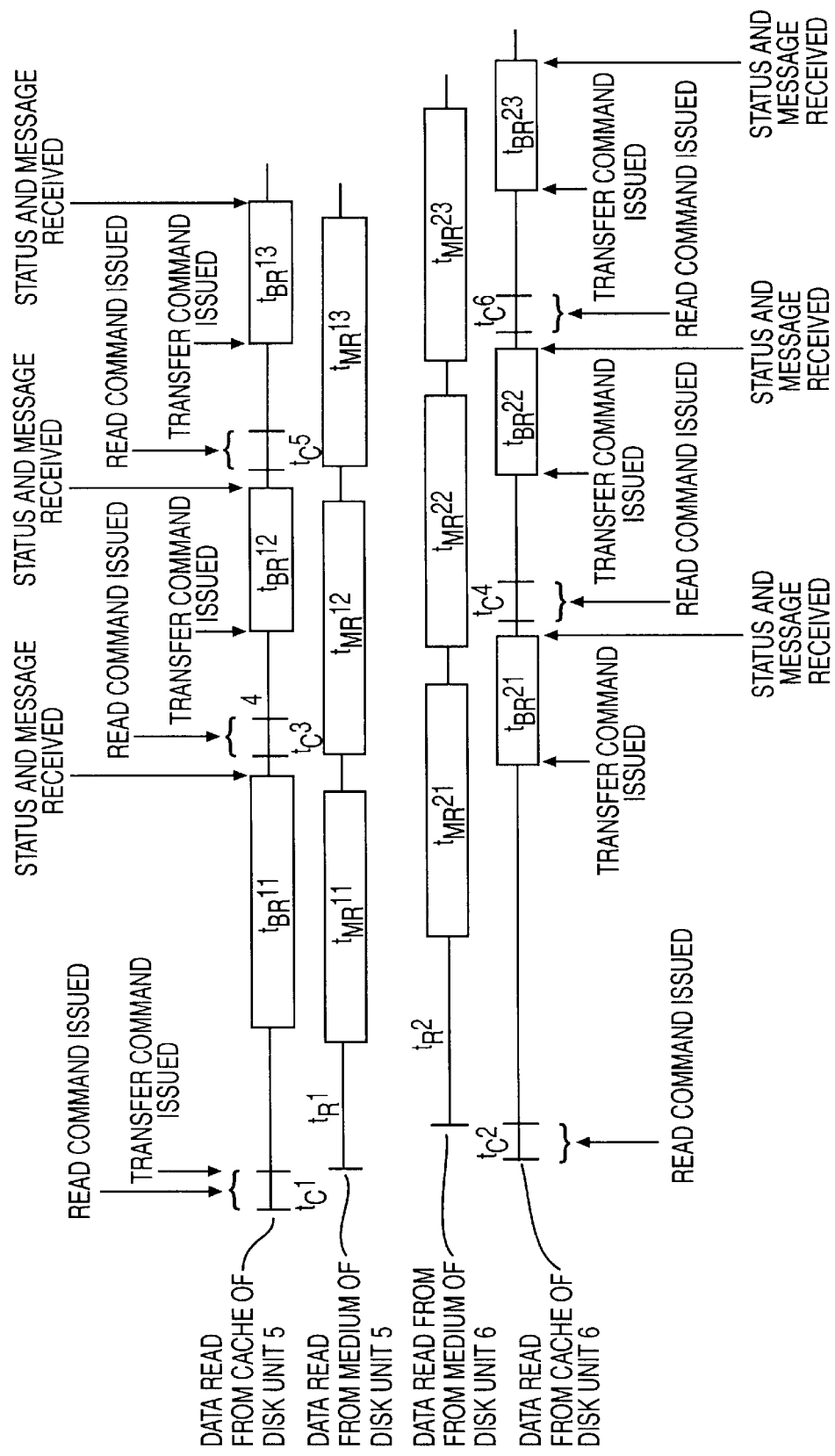
FIG. 4 is a view of a time chart regarding a disk read operation by the embodiment.

How the embodiment of the invention works will now be described with reference to FIGS. 4 through 7. FIG. 4 shows the timings of the hard disk units reading data illustratively from the cache memory and from the recording medium. The CPU 1 causes the SCSI controller 7 to execute the phases from "Bus Free" to "Selection" (see FIG. 3). When notified of the end of the "Selection" phase by interruption, the CPU 1 sends the command descriptor block (CDB) of a Read command to the hard disk unit 5 through the SCSI controller 7 (in time $t_c1$). With the "Command Out" phase completed, the CPU 1 sets in the DMA controller 3 the appropriate transfer starting address in the memory 4 and the number of transfer bytes (25 kilobytes). The CPU 1 also sets the number of transfer bytes (25 kilobytes) in a transfer counter inside the SCSI controller 7, and issues a Transfer command. Upon receipt of the command descriptor block (CDB), the hard disk unit 5 carries out a seek if needed depending on the address contained in the CDB. After a rotational delay time $t_R1$, the hard disk unit 5 reads the appropriate data from the recording medium 10 and into the cache memory 11. With the data written in the cache memory 11, a data transmission request signal REQ is placed on the SCSI bus. In response, the SCSI controller 7 returns a data transmission acknowledge signal ACK. This causes the data in the cache memory 11 to be stored into the memory 4 via the SCSI bus and SCSI controller 7. The time required to transfer the first 25 kilobytes of data is approximately the same as the time $t_{MR}11$ to read data from the medium 10 as well as the time $t_{BR}1$ to read data from the cache memory 11. With the transfer of 25 kilobytes of data completed, the SCSI controller 7 resets its internal transfer counter to 0 and issues an interruption to the CPU 1. In turn, the CPU 1 receives status and a message via the SCSI controller 7 to complete the protocol (see FIG. 3).

After the CPU 1 issues the Transfer command to the hard disk unit 5, the hard disk unit 6 starts an access operation. The CPU 1 controls the SCSI controller 8 to carry out the phases from "Bus Free" through "Selection" to "Command Out" (with a Read command to read 25 kilobytes of data, in time $t_c 2$). With the protocol of the hard disk unit 5 completed, the CPU 1 sets in the DMA controller 3 the transfer starting address in the memory 4 for the next data and the number of transfer bytes (25 kilobytes). The CPU 1 also sets the number of transfer bytes (25 kilobytes) in the transfer counter inside the SCSI controller 8, and issues a Transfer command. By this time, after a rotational delay time $t_R 2$, the hard disk unit 6 has read data from the recording medium 10 and into the internal cache memory 11 (in time $t_{MR}21$). Because the REQ signal is already asserted, issuing the Transfer command immediately starts data transfer (in time $t_{BR}21$).

After issuing the Transfer command to the SCSI controller 8, the CPU 1 causes the hard disk unit 5 to perform the phases from "Bus Free" to "Command Out" (with a Read command to read 25 kilobytes of data, in time $t_c 3$). A Transfer command matching the Read command is issued after the protocol of the hard disk unit 6 is completed (in time $t_{BR}12$). The above operations are repeated. In FIG. 4, times $t_c 3$ and $t_c 5$ are the times in which to issue commands to the hard disk unit 5; $t_{BR}11$ and $t_{BR}12$ are the times in which the hard disk unit 5 reads data from the cache memory 11; $t_{MR}12$ and $t_{MR}13$ are the times in which the hard disk unit 5 reads data from the recording medium 10; $t_{MR}22$ and $t_{MR}23$ are the times in which the hard disk unit 6 reads data from the medium 10; $t_c 4$ and $t_c 6$ are the times in which to issue commands to the hard disk unit 6; and $t_{BR}22$ and $t_{BR}23$ are the times in which the hard disk unit 6 reads data from the cache memory 11. FIG. 4 indicates the timings in effect when the time $t_{MR}11$ to read data from the medium 10 in the hard disk unit 5 is started earlier than the time $t_{MR}21$ to read data from the medium 10 in the hard disk unit 6. Such a state occurs because the hard disk units 5 and 6 rotate asynchronously with each other.

Figure 5:
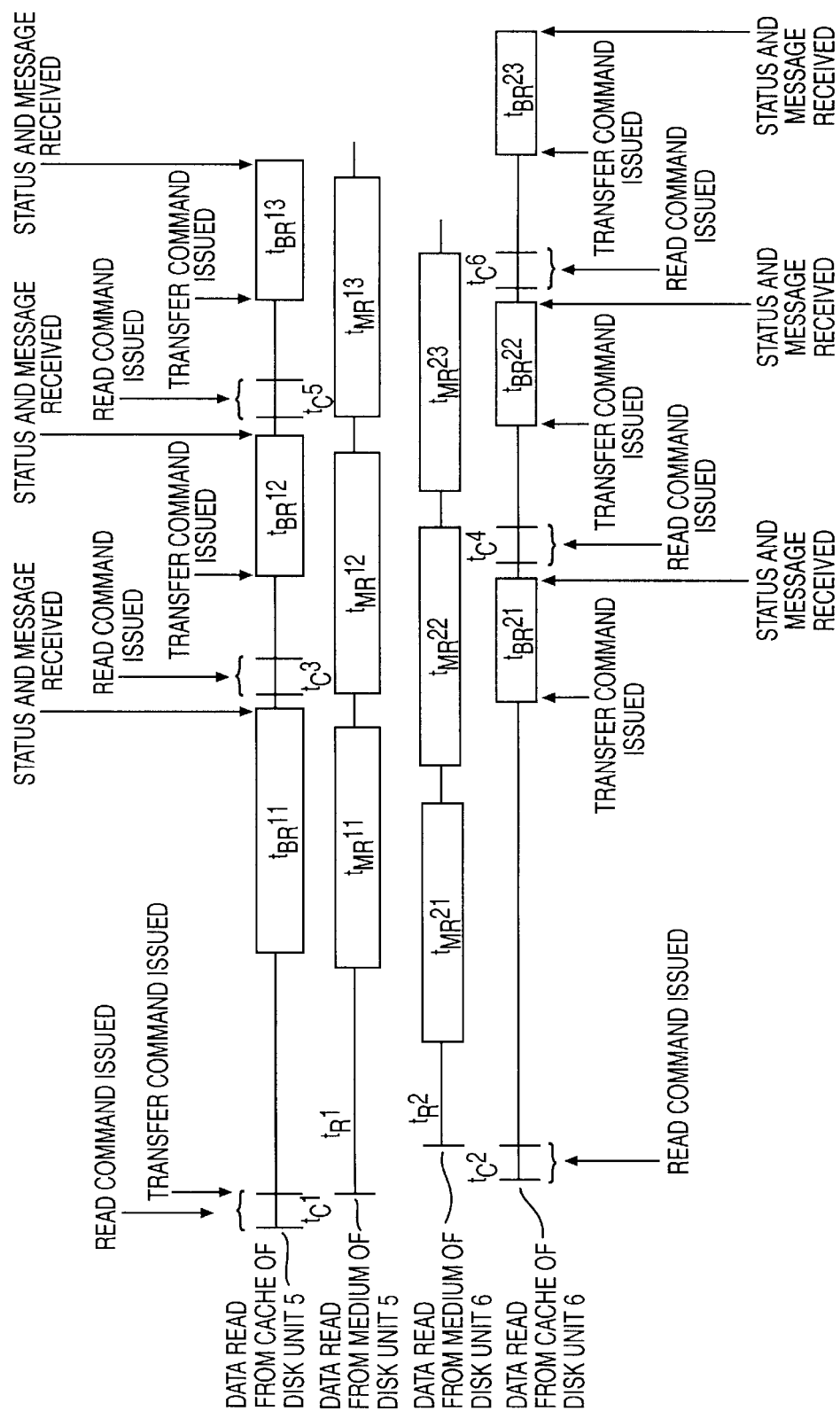
FIG. 5 is a view of another time chart regarding a disk read operation by the embodiment.

FIG. 5 is another time chart wherein the time $t_{MR}11$ to read data from the medium 10 in the hard disk unit 5 is started later than the time $t_{MR}21$ to read data from the medium 10 in the hard disk unit 6. In this case, the hard disk unit 6 reads a second unit of data from the recording medium 10 and into the cache memory when the first protocol of the hard disk unit 5 is completed. Because the cache memory is 64 kilobytes in capacity, data transfer is started immediately after the Transfer command is issued; there is no rotational delay involved.

Figure 6:
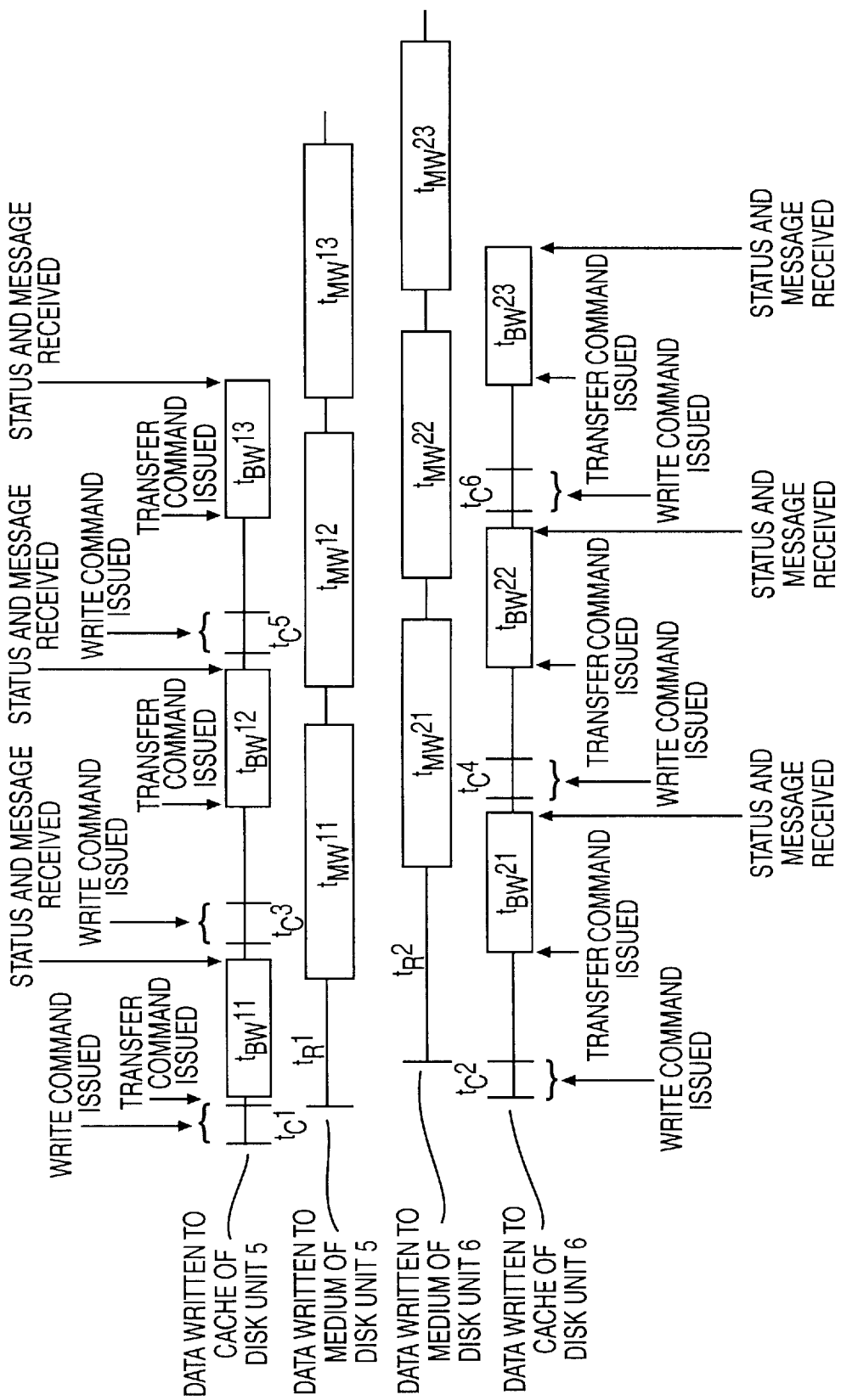
FIG. 6 is a view of a time chart regarding a disk write operation by the embodiment.
Figure 7:
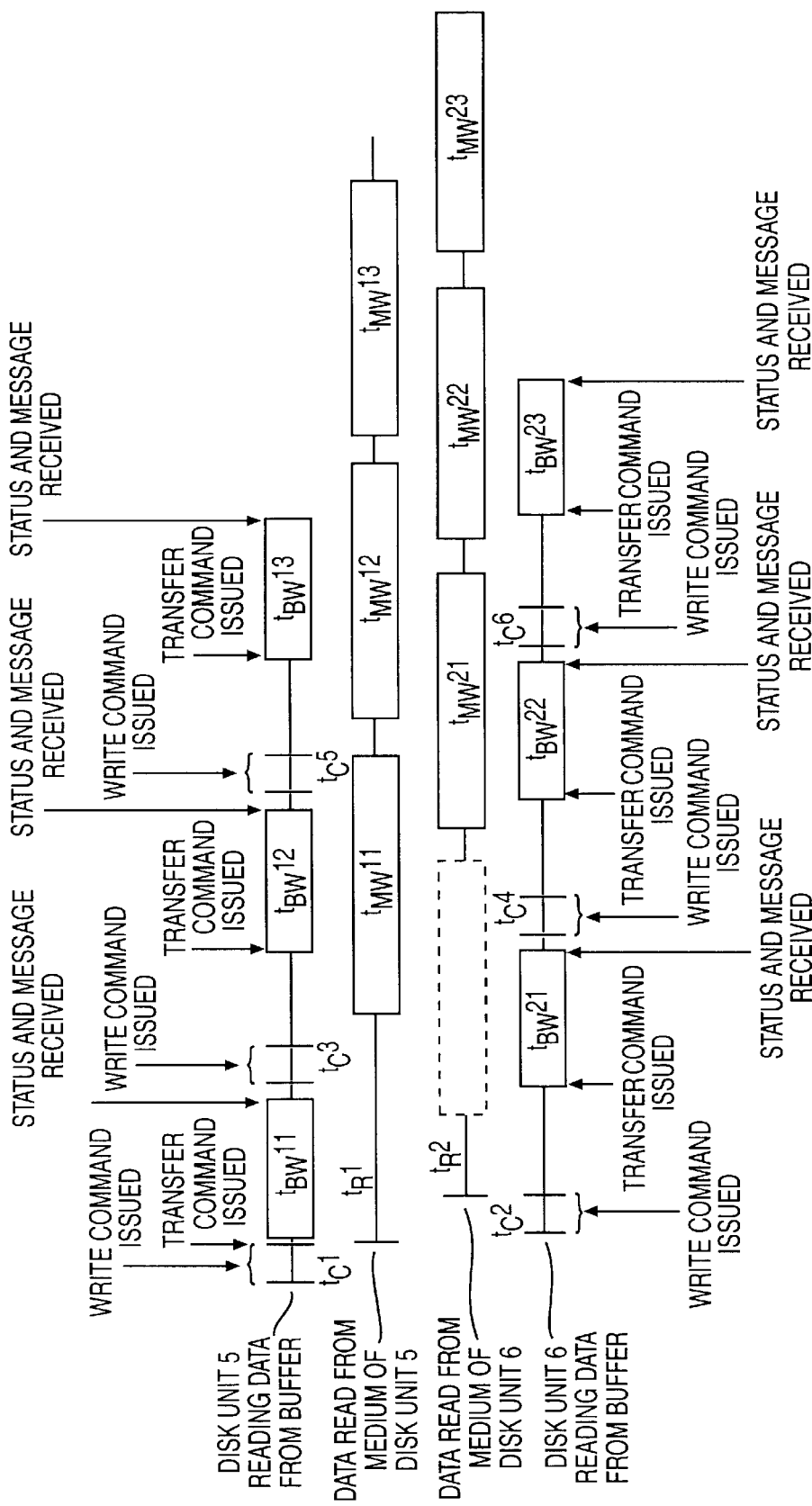
FIG. 7 is a view of another time chart regarding a disk write operation by the embodiment.

FIGS. 6 and 7 show the timings in effect when data are written to the hard disk units. When a predetermined amount of data (e.g., 25 kilobytes) is written to the memory 4 from the outside, the hard disk unit 5 starts to be accessed. The control procedure of the CPU 1 for the write operation is the same as that for the read operation in FIGS. 4 and 5 except that the commands are different. In FIGS. 6 and 7, times $t_{BW}11$, $t_{BW}12$ and $t_{BW}13$ are the times in which the hard disk unit 5 writes data to the cache memory; $t_{MW}11$, $t_{MW}12$ and $t_{MW}13$ are the times in which the hard disk unit 5 writes data to the recording medium; $t_{MW}21$, $t_{MW}22$ and $t_{MW}23$ are the times in which the hard disk unit 6 writes data to the recording medium; and $t_{BW}^{21}$, $t_{BW}22$ and $t_{BW}23$ are the times in which the hard disk unit 6 writes data to the cache memory.

FIG. 6 depicts the case in which data may be written to a target address earlier in the hard disk unit 5 following a rotational delay than in the hard disk unit 6; FIG. 7 shows the opposite case wherein data may be written earlier in the hard disk unit 6 than in the hard disk unit 5. In the latter case, the cache memory contains no data when the hard disk unit 6 becomes ready to receive data. Thus no write operation occurs this time in practice. That is, data are written to the recording medium after another rotational delay (16.6 ms=60 sec.÷3,600 rpm). It follows that the rotational delay time before the writing of data to the medium is $t_R 2+16.6$ ms. Since the capacity of the cache memory 11 is 64 kilobytes, the next and subsequent units of data are written to the medium with no further rotational delays.

In either of FIGS. 6 and 7, the protocol comes to an end when data are written to the cache memory. Thus the timing on the SCSI bus remains constant regardless of the rotational delay time involved.

Where data transfer between the external interface 9 and the memory 4 is made at a rate at least twice the actual transfer rate of any one of the hard disk units configured, as in the above embodiment, the memory 4 need only have a minimum capacity of 25 kilobytes. Although the embodiment above utilizes two hard disk units, the invention can be applied to setups involving three or more hard disk units.

As described and according to the disk control method of the invention, the protocol of one disk unit is completed first, followed by issuance of a command for the next protocol. Thereafter, the protocol of another disk unit is completed, followed by issuance of a Transfer command. The method allows data transfer to be started immediately between the cache memory and the disk units with no rotational delays involved. There is no need for a buffer memory of a large capacity, and large quantities of data are transferred sequentially at high speed to a data storage apparatus comprising a plurality of disk units without disturbing data sequence. The invention may be implemented by use of a single channel DMA controller arrangement.

When a preferred embodiment of the invention has been described using specific terms, such description is for illustrative purposes only, and it is to be understood that changes and variations may be made without departing from the spirit or scope of the following claims.

What is claimed is:

1. A method for transferring data divided into data units from a memory to disk units in an apparatus having n disk units, a CPU, and an interface independently connecting each of the n disk units to the CPU and the memory, each of said disk units having a cache and a physical storage medium, said apparatus having a protocol for transferring the data including issuance of a write command to one of the disk units to initiate a write operation, issuance of a transfer command to begin data transfer, and ending with a message indicating execution completion of the protocol, said method comprising:

issuing a first write command by the CPU for initiating a
    first write operation between the memory and a first of said n disk units, the first write command causing data to be transferred from the memory to the cache of the first disk unit;

issuing a second write command by the CPU for initiating a second write operation between the memory and a second of said n disk units, the second write command causing data to be transferred from the memory to the cache of the second disk unit, the second write command being issued after said first write command is issued;

repeating the previous step for each of third through n disk units, each repeated write command being issued after the write command to the previous disk unit has been issued;

issuing a first transfer command by the CPU to the first disk unit, causing the data in the cache of the first disk unit to be transferred to the physical storage medium of the first disk unit;

issuing a second transfer command by the CPU to the second disk unit, causing the data in the cache of the second disk unit to be transferred to the physical storage medium of the second disk unit, the second transfer command being issued immediately after the first transfer is completed; and repeating the previous step for each of the third through n disk units, each transfer command being issued immediately after the data transfer for the previous disk unit is complete.

2. The method of claim 1, wherein the data transfer to said n disk units is carried out synchronously.

3. The method of claim 1, wherein n is greater than or equal to three.

4. A method of transferring data from a memory to disk units in an apparatus having n disk units, a CPU, and an interface independently connecting each of the n disk units to the CPU and the memory, each of said disk units having a cache and a physical storage medium, said apparatus having a protocol for transferring the data including issuance of a write command to one of the disk units to initiate a write operation and issuance of a transfer command to begin data transfer, said method comprising:

successively issuing first through nth write commands by the CPU to first through nth disk units, the first through nth write commands causing data to be transferred from the memory to the cache of the first through nth disk units, respectively;

successively issuing first through nth transfer commands by the CPU respectively to the first through nth disk units for causing the data in the cache of the first through nth disk units to be transferred to the physical medium of the first through nth disk units, respectively, the first of the first through nth transfer commands being issued before the nth write command is complete.

5. The method of claim 4, wherein the data transfer to said n disk units is carried out synchronously.

6. The method of claim 4, wherein n is greater than or equal to three.

* * * * *